(12) United States Patent
Sato et al.

(10) Patent No.: US 12,420,668 B2
(45) Date of Patent: Sep. 23, 2025

(54) POWER SUPPLY CONTROL SYSTEM AND INDUSTRIAL VEHICLE

(71) Applicant: KABUSHIKI KAISHA TOYOTA JIDOSHOKKI, Kariya (JP)

(72) Inventors: Takuya Sato, Kariya (JP); Hitoshi Maruyama, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 118 days.

(21) Appl. No.: 18/569,471

(22) PCT Filed: Mar. 23, 2022

(86) PCT No.: PCT/JP2022/013723
§ 371 (c)(1),
(2) Date: Dec. 12, 2023

(87) PCT Pub. No.: WO2022/264602
PCT Pub. Date: Dec. 22, 2022

(65) Prior Publication Data
US 2024/0270117 A1    Aug. 15, 2024

(30) Foreign Application Priority Data
Jun. 14, 2021 (JP) .................................. 2021-098477

(51) Int. Cl.
*B60L 58/18* (2019.01)
*B60L 3/04* (2006.01)
(Continued)

(52) U.S. Cl.
CPC ................. *B60L 58/18* (2019.02); *B60L 3/04* (2013.01); *H01M 10/48* (2013.01); *H02J 7/00045* (2020.01); *B60L 2200/44* (2013.01)

(58) Field of Classification Search
None
See application file for complete search history.

(56) References Cited

U.S. PATENT DOCUMENTS 9,472,941 B2 * 10/2016 Kuroda .................... H02H 3/12
10,766,751 B2 * 9/2020 Kirk ..................... B66F 9/07572
(Continued)

FOREIGN PATENT DOCUMENTS

| CN | 107298027 A | 10/2017 |
| CN | 109748202 A | 5/2019 |

(Continued)

OTHER PUBLICATIONS

Communication issued Jan. 13, 2025 in Canadian Application No. 3,217,435.
(Continued)

*Primary Examiner* — Peter D Nolan
*Assistant Examiner* — Jacob Kent Besteman-Street
(74) *Attorney, Agent, or Firm* — Sughrue Mion, PLLC

(57) ABSTRACT

A power supply control system includes: a vehicle control device including a reception unit, an electrical connector, and a communication connector; connection determination units; and supply control units. The supply control units determine that the battery is the first battery and permits the power supply to the reception unit in a case where it is determined that the communication connector is connected and there is no power supply to the reception unit, determine that the battery is unknown and prohibits the power supply to the reception unit in a case where it is determined that the communication connector is not connected and there is no power supply to the reception unit, and determine that the battery is the second battery in a case where it is determined that the communication connector is not connected and there is power supply to the reception unit.

8 Claims, 7 Drawing Sheets

(51) Int. Cl.
*H01M 10/48* (2006.01)
*H02J 7/00* (2006.01)

(56) References Cited

U.S. PATENT DOCUMENTS

| | | | |
|---|---|---|---|
| 11,124,073 B2* | 9/2021 | Johnson | B60L 58/21 |
| 2013/0234655 A1* | 9/2013 | Miwa | H02J 7/04 |
| | | | 320/107 |
| 2016/0229307 A1* | 8/2016 | Brochhaus | B60L 58/21 |
| 2017/0297880 A1 | 10/2017 | Kirk et al. | |
| 2019/0135112 A1 | 5/2019 | Johnson | |
| 2021/0229556 A1 | 7/2021 | Johnson | |
| 2021/0384742 A1* | 12/2021 | Wei | H02J 7/00036 |
| 2023/0060600 A1* | 3/2023 | Shigemori | H01M 50/249 |
| 2023/0318314 A1* | 10/2023 | Kobayakawa | H01M 10/486 |
| | | | 318/139 |

FOREIGN PATENT DOCUMENTS

| | | | |
|---|---|---|---|
| CN | 111077458 A | | 4/2020 |
| JP | 2008193784 A | * | 8/2008 |
| JP | 2014-180185 A | | 9/2014 |
| JP | 2017-189032 A | | 10/2017 |
| JP | 2019-177722 A | | 10/2019 |
| JP | 2020-58150 A | | 4/2020 |

OTHER PUBLICATIONS

International Preliminary Report on Patentability dated Dec. 14, 2023 with a Translation of the Written Opinion of the International Searching Authority in Application No. PCT/JP2022/013723.
International Search Report for PCT/JP2022/013723 dated May 31, 2022.

* cited by examiner

POWER SUPPLY CONTROL SYSTEM AND INDUSTRIAL VEHICLE

CROSS REFERENCE TO RELATED APPLICATIONS

This application is a National Stage of International Application No. PCT/JP2022/013723 filed Mar. 23, 2022, claiming priority based on Japanese Patent Application No. 2021-098477 filed Jun. 14, 2021.

TECHNICAL FIELD

The present disclosure relates to a power supply control system and an industrial vehicle.

BACKGROUND ART

Patent Literature 1 describes a vehicle-mounted battery determination system capable of determining whether or not a correct type of battery is mounted on a vehicle. This conventional system includes a battery-side first control device that is provided in a battery pack including a battery and stores battery information related to identification of the battery, and a vehicle-side second control device that stores mounted battery information related to a battery to be mounted on a vehicle. In this system, for example, the mounted battery information and the battery information are compared by communication between the first control device and the second control device, and it is determined whether or not the battery mounted on the vehicle matches an on-board battery.

CITATION LIST

Patent Literature

Patent Literature 1: Japanese Unexamined Patent Publication No. 2020-58150

SUMMARY OF INVENTION

Technical Problem

Batteries that can be mounted on a vehicle include a battery having a battery control device for controlling power supply of the battery itself and a battery having no battery control device. In a case where a battery without a battery control device is mounted on a vehicle, communication is not performed between a vehicle control device and the battery, and thus power is supplied from the battery without comparing the mounted battery information with the battery information. Even in a case where a battery having a battery control device is mounted on a vehicle, communication is not performed between the battery control device and the vehicle control device due to forgetting to insert a communication connector or the like. Therefore, there is a problem in performing appropriate control according to the type and connection state of the battery.

The present disclosure has been made to solve the above problems, and an object of the present disclosure is to provide a power supply control system capable of executing appropriate control according to a type and a connection state of a battery mounted on a vehicle, and an industrial vehicle mounted with the power supply control system.

Solution to Problem

A power supply control system according to one aspect of the present disclosure is a power supply control system determining a type of a battery mounted on a vehicle and controlling power supply to the vehicle by the battery, the power supply control system including: a vehicle control device including a reception unit configured to receive power from a first battery having a battery control device or a second battery not having a battery control device, an electrical connector electrically connected to the battery, and a communication connector connected to the battery control device so as to be capable of communicating information; a connection determination unit configured to determine whether or not the communication connector is connected in a case where the battery is connected to the electrical connector; and a supply control unit configured to control availability of power supply from the battery to the reception unit based on a determination result of the connection determination unit and a power supply status to the reception unit. The supply control unit determines that the battery is the first battery, and permits power supply to the reception unit in a case where it is determined that the communication connector is connected and there is no power supply to the reception unit, determines that the battery is unknown and prohibits power supply to the reception unit in a case where it is determined that the communication connector is not connected and there is no power supply to the reception unit, and determines that the battery is the second battery in a case where it is determined that the communication connector is not connected and there is power supply to the reception unit.

In the power supply control system, the type of the battery mounted on the vehicle is determined on the basis of the presence or absence of connection of the communication connector and the status of power supply to the reception unit. According to such a configuration, it is possible to determine whether the battery mounted on the vehicle is the first battery having the battery control device, the second battery having no battery control device, or an unknown battery, and it is possible to determine that the communication connector is left unplugged when the first battery is mounted. Therefore, in this power supply system, appropriate control can be executed according to the type and connection state of the battery mounted on the vehicle.

The power supply control system may further include: a storage unit configured to store mounted battery information related to mounting of the battery; and a comparison unit configured to compare the mounted battery information stored in the storage unit with battery information related to identification of the battery connected to the electrical connector. This makes it possible to appropriately operate the battery connected to the electrical connector.

The comparison unit may be provided in the vehicle control device. In this case, comparison processing between the mounted battery information and the battery information can be completed on a side of the vehicle control device.

The comparison unit may be provided in the battery control device. In this case, by executing the comparison processing between the mounted battery information and the battery information on a side of the battery control device, it is possible to reduce a change to the existing vehicle control device.

The connection determination unit may determine whether or not the communication connector is connected based on whether or not CAN communication between the vehicle control device and the battery control device is successfully connected. In this case, the presence or absence of connection of the communication connector can be determined using the existing configuration.

The connection determination unit may include a connection detection circuit configured to detect physical connection of the battery to the communication connector, and may determine whether or not the communication connector is connected based on an open or closed state of the connection detection circuit. In this case, it is possible to more reliably detect whether or not the communication connector is connected.

The supply control unit may generate state information indicating that a communication state is abnormal in a case of determining that the battery is the second battery. In this case, for example, this facilitates the operation of limiting the battery mounted on the vehicle to the first battery.

An industrial vehicle may be mounted with the vehicle control device constituting the power supply control system. In the industrial vehicle to which the vehicle control device constituting the power supply control system is applied, appropriate control can be executed according to the type and connection state of the battery mounted on the vehicle.

Advantageous Effects of Invention

According to the present disclosure, it is possible to execute appropriate control according to a type and a connection state of a battery mounted on a vehicle.

DESCRIPTION OF EMBODIMENTS

Hereinafter, a preferred embodiment of a power supply control system according to one aspect of the present disclosure will be described in detail with reference to the drawings.

Figure 1:
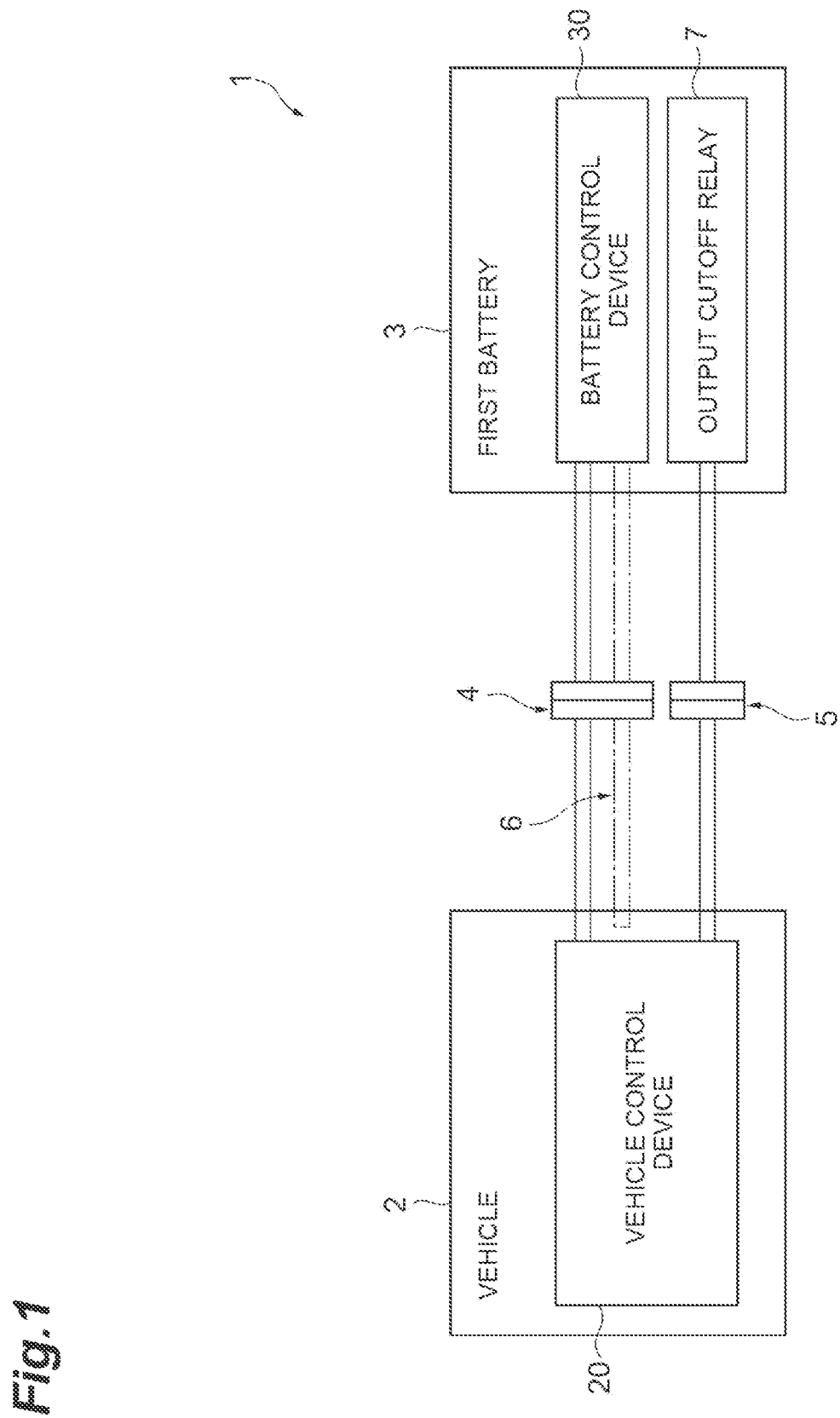
FIG. 1 is a diagram illustrating an outline of a power supply control system.
Figure 2:
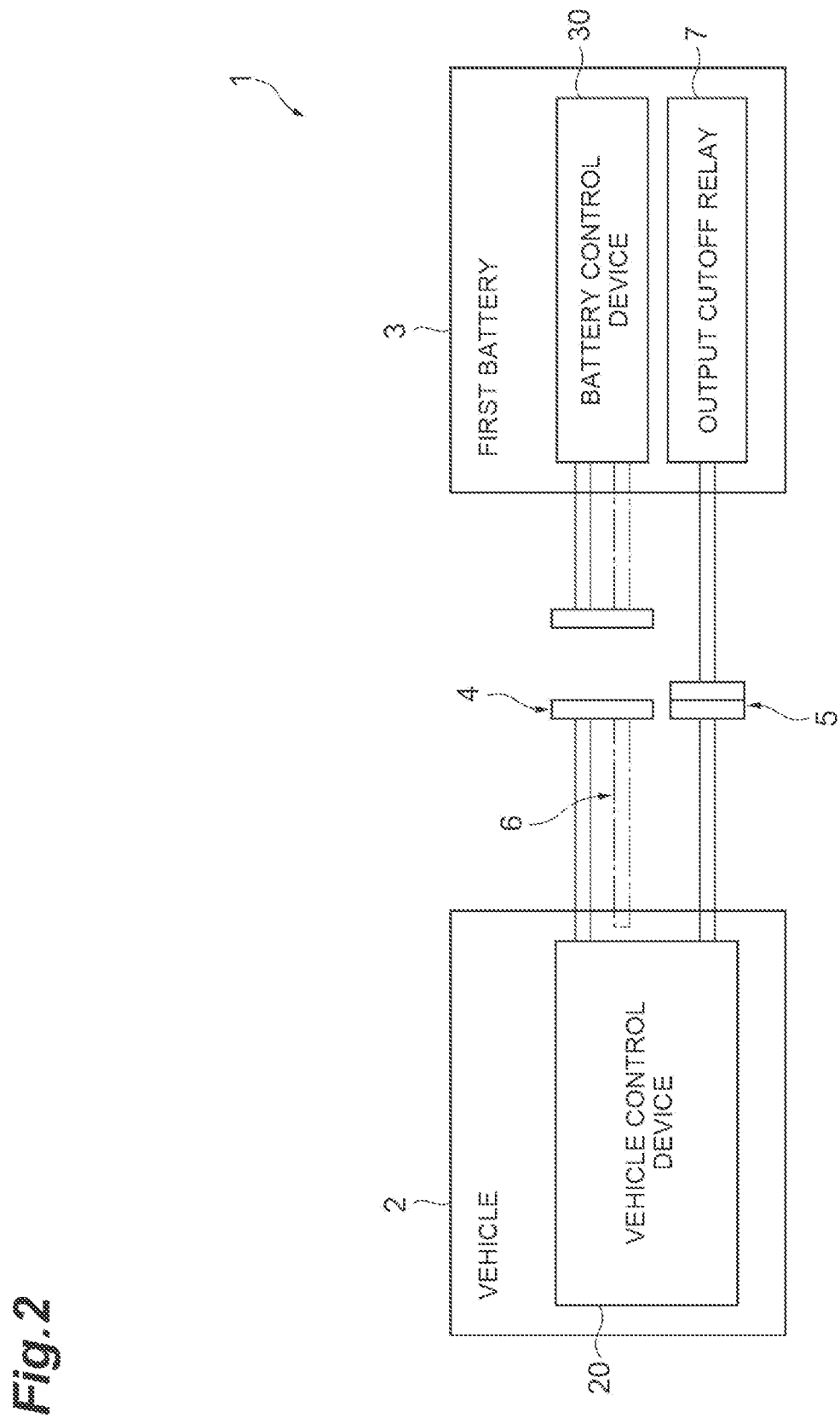
FIG. 2 is a diagram illustrating an outline of the power supply control system.
Figure 3:
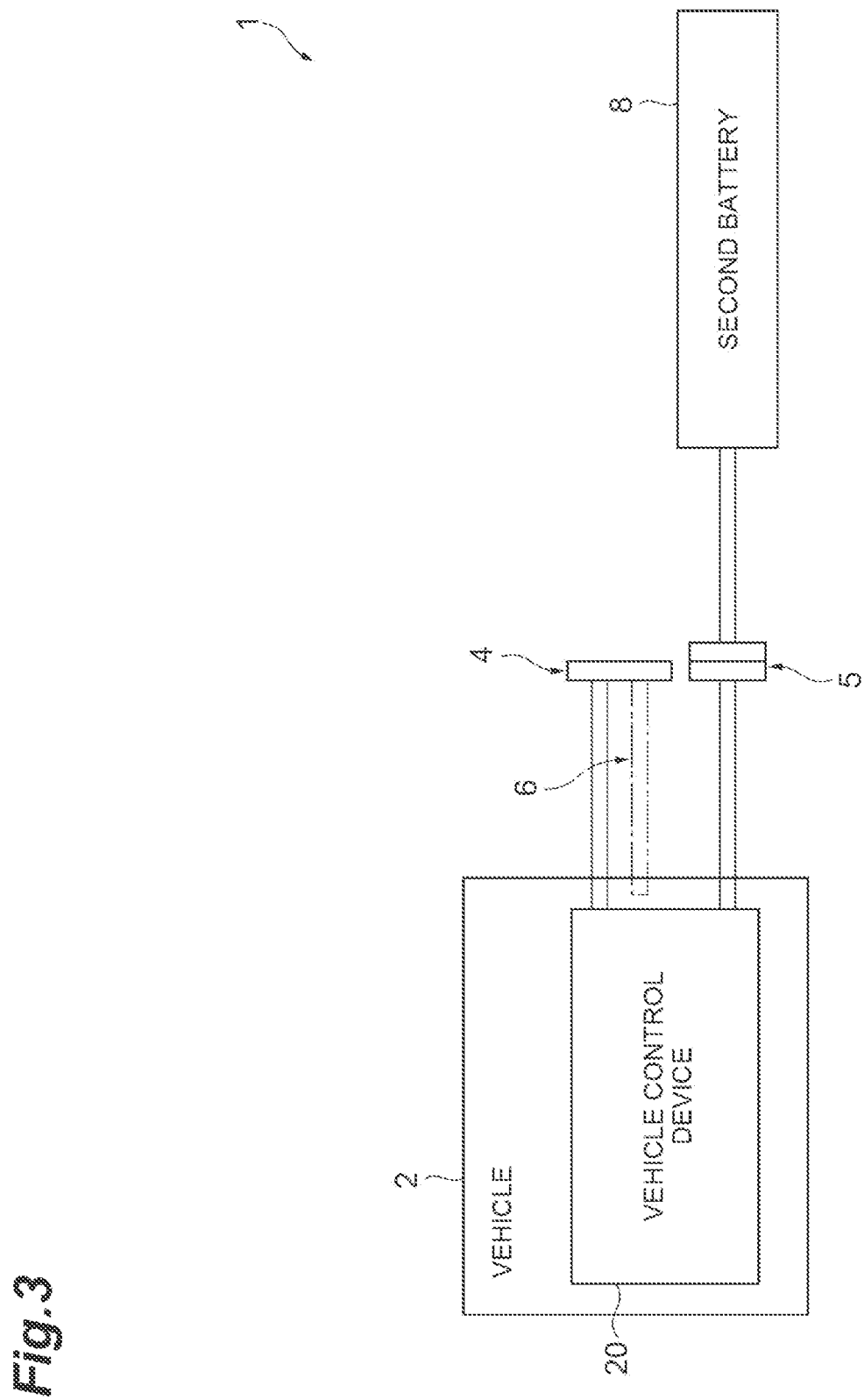
FIG. 3 is a diagram illustrating an outline of the power supply control system.

FIGS. 1 to 3 are diagrams illustrating an outline of a power supply control system according to an embodiment of the present disclosure. A power supply control system 1 is a system that determines a type of battery mounted on a vehicle 2 and controls power supply to the vehicle 2 by the battery. Examples of the vehicle 2 to which the power supply control system 1 is applied include passenger vehicles such as electric cars and hybrid cars, and industrial vehicles such as forklifts. Batteries that can be mounted on the vehicle 2 include a first battery having a battery control device for controlling power supply of the battery itself and a second battery having no battery control device. Examples of the first battery include a lithium ion secondary battery, and examples of the second battery include a lead-acid battery.

FIG. 1 illustrates an example in which the first battery 3 is mounted on the vehicle 2. The vehicle 2 includes a vehicle control device 20 that comprehensively manages various controls of the vehicle itself. The vehicle control device 20 is, for example, an electronic control unit (ECU). The vehicle control device 20 includes a communication connector 4 and an electrical connector 5. When the first battery 3 is mounted on the vehicle 2, the communication connector 4 and the electrical connector 5 are connected. The first battery 3 includes a battery control device 30 and an output cutoff relay 7.

The vehicle control device 20 and the battery control device 30 are electronic control units including a central processing unit (CPU), a read only memory (ROM), a random access memory (RAM), a controller area network (CAN) communication circuit, and the like. In the vehicle control device 20, for example, a program stored in the ROM is loaded into the RAM, and the program loaded into the RAM is executed by the CPU to implement various functions.

The communication connector 4 is a connector that connects the vehicle control device 20 and the battery control device 30 so as to enable information communication, and is, for example, a connector for CAN communication. The communication connector 4 is connected to the vehicle control device 20 and is also connected to the battery control device 30.

The electrical connector 5 is a conductive connector that electrically connects the vehicle control device 20 and a battery (the first battery 3 in the example of FIG. 1) mounted on the vehicle 2. The electrical connector 5 is connected to the vehicle control device 20 and is connected to the output cutoff relay 7 in the first battery 3. In a case where the first battery 3 is connected to the electrical connector 5 by the output cutoff relay 7, power supply from the first battery 3 to the vehicle control device 20 is not unconditionally performed.

A connection detection circuit 6 detects a physical connection of the battery to the communication connector 4. The connection detection circuit 6 includes, for example, a short pin integrally formed with a connection portion of the communication connector 4. In the connection detection circuit 6, an open or closed state of a conductive loop circuit changes according to the connection state of the communication connector 4. Specifically, when the communication connector 4 is physically connected, the connection detection circuit 6 is also closed and electrically connected. When the communication connector 4 is physically disconnected, the connection detection circuit 6 is also opened to release the electrical connection. In other words, in a case where the connection detection circuit 6 is closed, a state in which the communication connector 4 is connected can be detected, and in a case where the connection detection circuit 6 is open, a state in which the communication connector 4 is not connected can be detected. The open or closed state of the connection detection circuit 6 can be detected by the presence or absence of electrical connection. The connection detection circuit 6 may be included in the vehicle control device 20 or may be included in the battery control device 30.

The battery control device 30 outputs, to the output cutoff relay 7, instruction information for controlling power supply to the output cutoff relay 7. The output cutoff relay 7 switches availability of power supply to the vehicle control device 20 in response to the instruction information. In the example of FIG. 1, the battery control device 30 outputs, to the output cutoff relay 7, instruction information indicating that power supply is permitted. The output cutoff relay 7 supplies power to the vehicle control device 20 in response to the instruction information.

FIG. 2 illustrates an example in which the communication connector 4 is not connected and the electrical connector 5 is connected when the first battery 3 is mounted on the vehicle 2. When the communication connector 4 is in a disconnection state, the connection detection circuit 6 is in an open state. Furthermore, information communication is disabled between the vehicle control device 20 and the battery control device 30. In the example of FIG. 2, the battery control device 30 outputs, to the output cutoff relay 7, instruction information indicating that power supply is prohibited. The output cutoff relay 7 prohibits power supply to the vehicle control device 20 in response to the instruction information.

FIG. 3 illustrates an example in which the second battery 8 is mounted on the vehicle 2. The electrical connector 5 is connected when the second battery 8 is mounted on the vehicle 2. Since the second battery 8 does not have a battery control device, the communication connector 4 is not connected. When the communication connector 4 is in a disconnection state, the connection detection circuit 6 is in an open state.

The electrical connector 5 is connected to the vehicle control device 20 and to the second battery 8. When the second battery 8 is connected to the electrical connector 5, electric power is supplied to the vehicle control device 20.

Figure 4:
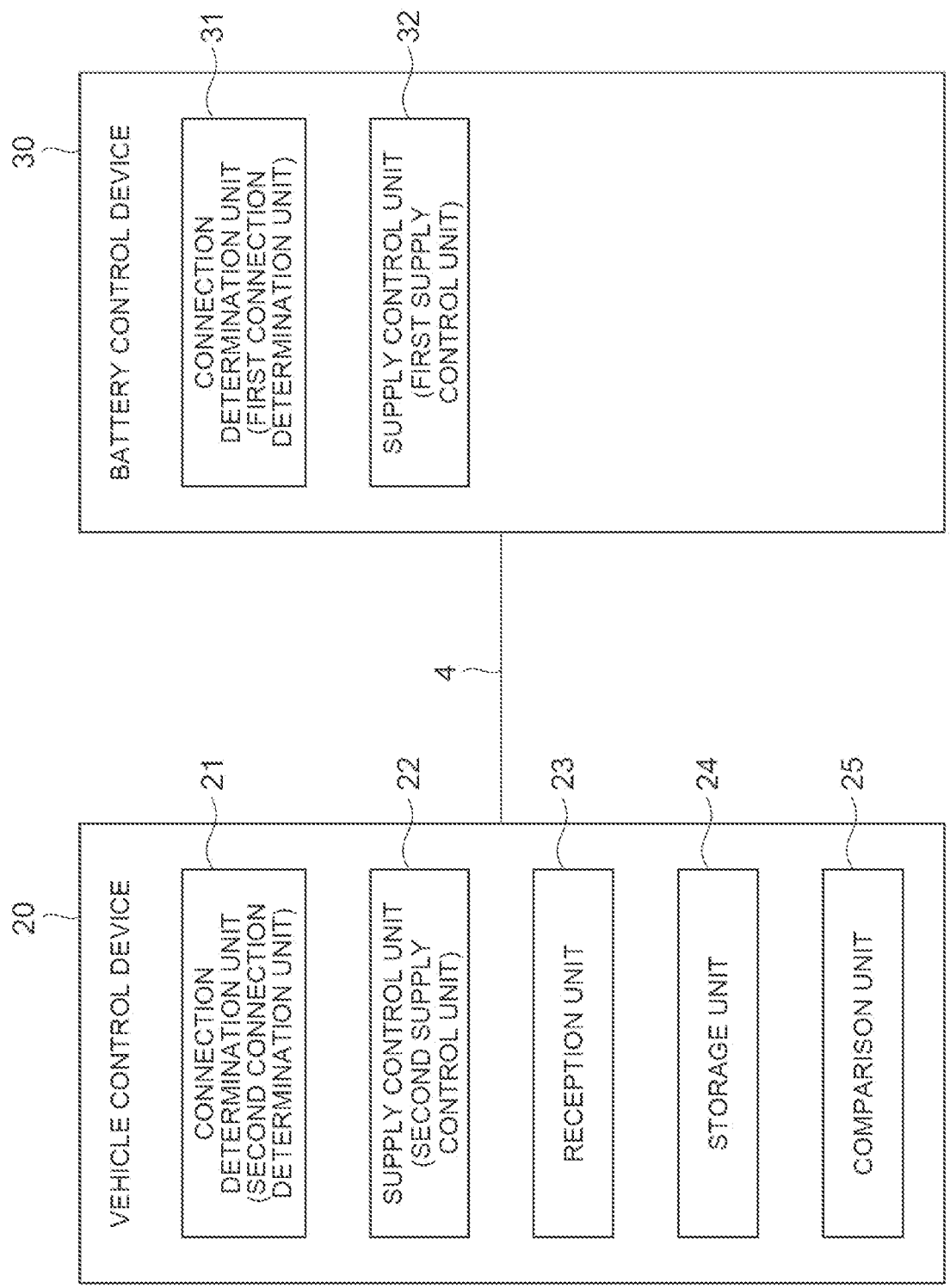
FIG. 4 is a block diagram illustrating functions of a vehicle control device and a battery control device.

FIG. 4 is a block diagram illustrating functions of the vehicle control device 20 and the battery control device 30. The battery control device 30 includes a connection determination unit (first connection determination unit) 31 and a supply control unit (first supply control unit) 32. The vehicle control device 20 includes a connection determination unit (second connection determination unit) 21, a supply control unit (second supply control unit) 22, a reception unit 23, a storage unit 24, and a comparison unit 25 as functional elements.

In a case where a battery is connected to the electrical connector 5, the connection determination unit 31 determines whether or not the communication connector 4 is connected. For example, the connection determination unit 31 determines whether or not the communication connector 4 is connected on the basis of whether or not CAN communication between the vehicle control device 20 and the battery control device 30 is successfully connected. Alternatively or additionally, the connection determination unit 31 includes the connection detection circuit 6 that detects physical connection of the battery to the communication connector 4, and determines whether or not the communication connector 4 is connected based on an open or closed state of the connection detection circuit 6.

The supply control unit 32 controls availability of power supply from the battery to the reception unit 23 on the basis of a determination result of the connection determination unit 31 and a power supply status to the reception unit 23. For example, in a case where it is determined that the communication connector 4 is connected and there is no power supply to the reception unit 23, the supply control unit 32 determines that the battery mounted on the vehicle 2 is the first battery 3 and permits the power supply from the first battery 3 to the reception unit 23. The supply control unit 32 determines a type of the battery from battery information related to the identification of the battery connected to the electrical connector 5. The battery information is, for example, information indicating that the battery itself is the first battery 3. The battery information is stored in a predetermined storage device of the battery control device 30.

The connection determination unit 21 has a function similar to that of the connection determination unit 31. In a case where the connection determination unit 31 cannot determine whether or not the communication connector 4 is connected, the connection determination unit 21 determines whether or not the communication connector 4 is connected. Examples of the case where the connection determination unit 31 cannot determine whether or not the communication connector 4 is connected include a case where the second battery 8 is mounted on the vehicle 2 and a case where the vehicle control device 20 includes the connection detection circuit 6.

The supply control unit 22 has the same function as the supply control unit 32. In a case where the supply control unit 32 cannot control availability of power supply from the battery to the reception unit 23, the supply control unit 22 controls availability of the power supply. The case where the supply control unit 32 cannot control whether or not to supply power from the battery to the reception unit 23 is, for example, a case where the second battery 8 is mounted on the vehicle 2. In this case, the supply control unit 22 may switch a relay or the like for the reception unit 23 to receive power. In a case of determining that the battery is the second battery 8, the supply control unit 22 generates state information indicating that the communication state is abnormal. The state information indicates an abnormality of the communication state caused by disconnection of the communication connector 4.

The reception unit 23 receives power from the first battery 3 having the battery control device 30 or the second battery 8 having no battery control device. The electrical connector 5 is connected to the reception unit 23.

The storage unit 24 stores mounted battery information related to mounting of a battery (related to a battery to be mounted on a vehicle) in a predetermined storage device of the vehicle control device 20. The mounted battery information is, for example, information related to a type of a battery that can be mounted on the vehicle 2, an appropriate value of an output of the battery, a parameter related to a battery protection function, and the like. The storage unit 24 may receive an operation of a user of the vehicle 2 to designate whether the mounted battery information is the first battery 3 or the second battery 8.

The comparison unit 25 receives the battery information from the battery control device 30 via the communication connector 4. Then, the comparison unit 25 compares the mounted battery information stored in the storage unit 24 with the received battery information.

Figure 5:
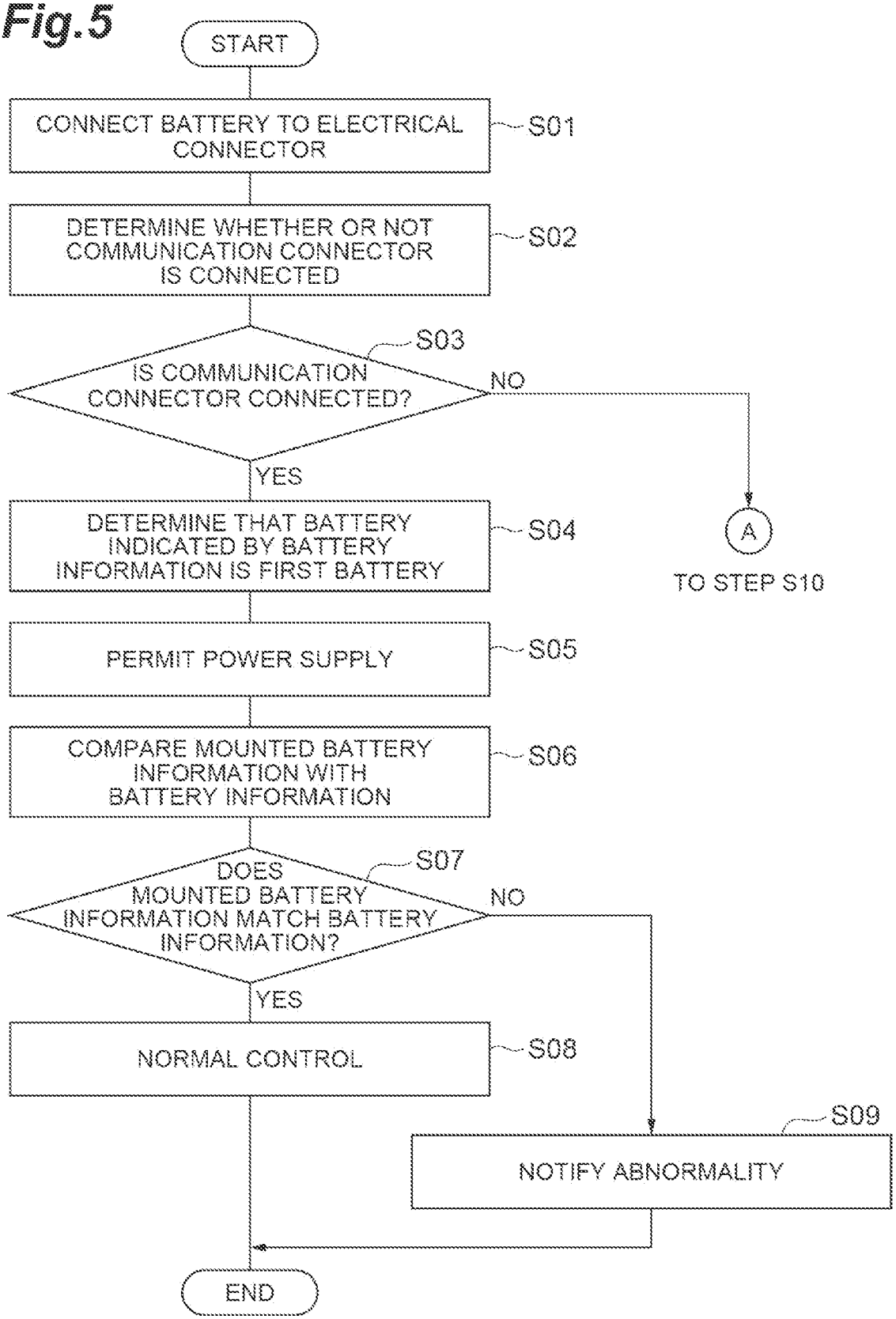
FIG. 5 is a flowchart illustrating an operation of the power supply control system.

An example of an operation of the power supply control system 1 will be described with reference to FIGS. 5 and 6. First, in FIG. 5, when a battery is mounted on the vehicle 2, the electrical connector 5 is connected (step S01).

The connection determination unit 31 determines whether or not the communication connector 4 is connected (step S02). For example, the connection determination unit 31 determines whether or not the communication connector 4 is connected on the basis of whether or not CAN communication between the vehicle control device 20 and the battery control device 30 is successfully connected. The connection determination unit 31 determines that the communication connector 4 is connected in a case where the CAN communication succeeds, and determines that the communication connector 4 is not connected in a case where the CAN communication fails. Alternatively or additionally, the connection determination unit 31 includes the connection detection circuit 6, and determines whether or not the communication connector 4 is connected based on an open or closed state of the connection detection circuit 6. The connection determination unit 31 determines that the communication connector 4 is connected in a case where the connection detection circuit 6 is in a closed state, and determines that the communication connector 4 is not connected in a case where the connection detection circuit 6 is in an open state.

In a case where the communication connector 4 is connected (YES in step S03), the process proceeds to step S04. In a case where the communication connector 4 is not connected (NO in step S03), the process proceeds to step S10.

In a case where it is determined that the communication connector 4 is connected and there is no power supply to the reception unit 23, the supply control unit 32 determines that the battery is the first battery 3 (step S04). The supply control unit 32 determines the type of the battery based on, for example, the battery information. The type of the battery may be determined by the supply control unit 22. For example, the supply control unit 22 determines the type of the battery by receiving the battery information from the battery control device 30 via the communication connector 4.

The supply control unit 32 permits power supply to the reception unit 23 (step S05). The supply control unit 32 outputs, to the output cutoff relay 7, instruction information indicating that power supply is permitted. The output cutoff relay 7 supplies power to the reception unit 23 in response to the instruction information from the supply control unit 32. The power supply may be performed before step S04.

The comparison unit 25 receives the battery information from the battery control device 30 via the communication connector 4. Then, the comparison unit 25 compares the mounted battery information stored in the storage unit 24 with the received battery information (step S06).

In a case where the mounted battery information matches the battery information (YES in step S07), the process proceeds to step S08. In a case where the mounted battery information does not match the battery information (NO in step S07), the process proceeds to step S09.

The power supply control system 1 continues the supply of power to the reception unit 23 on the assumption that normal control is possible (step S08). The comparison unit 25 may notify the user of the vehicle 2 of the normal control by displaying information indicating that the comparison result is normal on a display or the like included in the vehicle 2.

The comparison unit 25 notifies the user of the vehicle 2 of the abnormality by displaying information indicating that the comparison result is abnormal on the display or the like included in the vehicle 2 (step S09).

Figure 6:
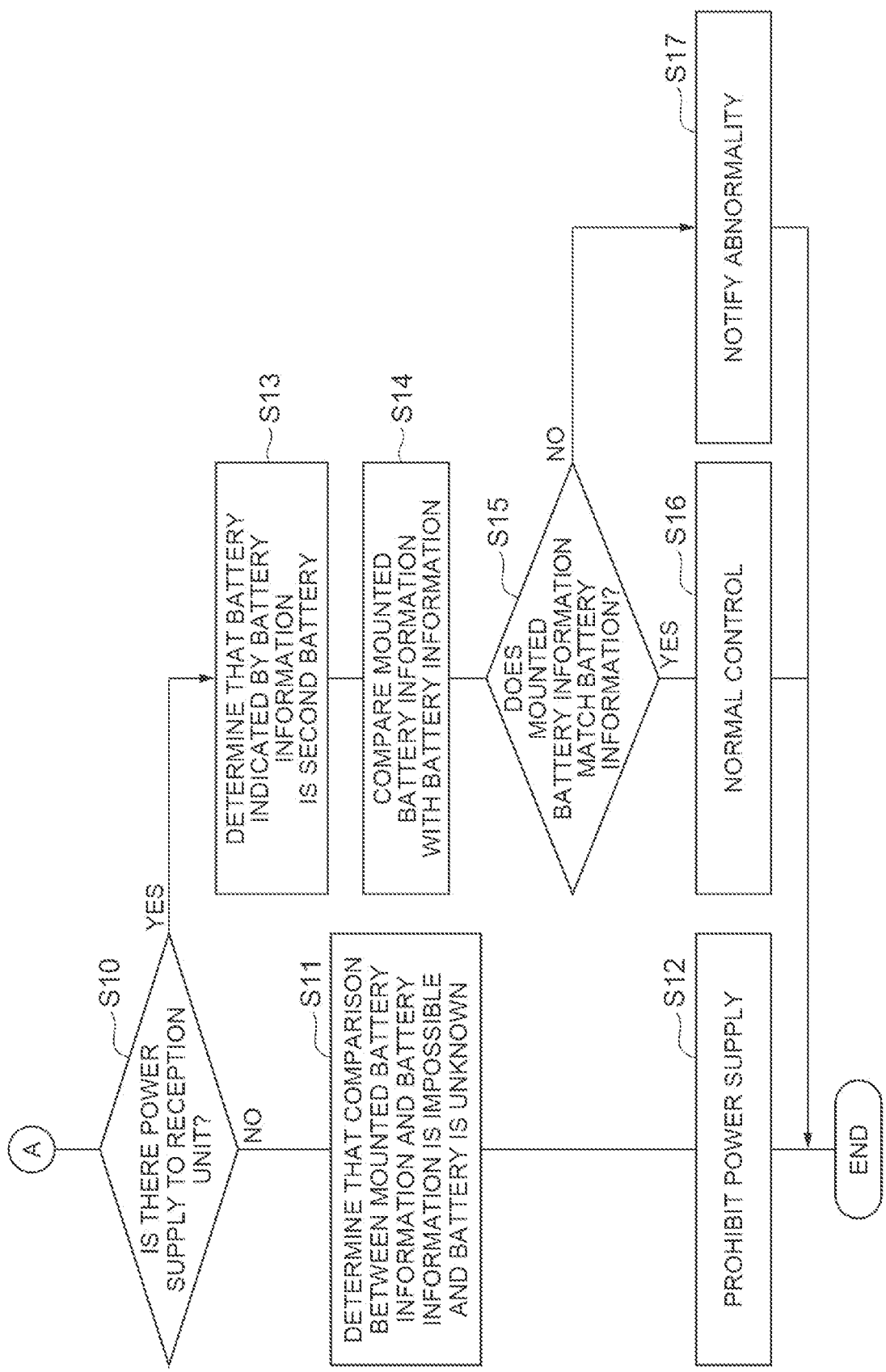
FIG. 6 is a flowchart illustrating an operation of the power supply control system.

Referring now to FIG. 6, processing performed in a case where the communication connector 4 is not connected (NO in step S03) is described. The supply control units 32 and 22 determine whether or not power is supplied to the reception unit 23. In a case where there is no power supply to the reception unit 23 (NO in step S10), the process proceeds to step S11. In a case where there is the power supply to the reception unit 23 (YES in step S10), the process proceeds to step S13.

In a case where it is determined that the communication connector 4 is not connected and there is no power supply to the reception unit 23, the supply control unit 32 determines that comparison between the mounted battery information and the battery information is impossible and the battery is unknown (step S11).

The supply control unit 32 prohibits the power supply to the reception unit 23 (step S12). The supply control unit 32 outputs, to the output cutoff relay 7, instruction information indicating prohibition of the power supply. In response to the instruction information, the output cutoff relay 7 prohibits the power supply to the reception unit 23.

In a case where it is determined that the communication connector 4 is not connected and there is power supply to the reception unit 23, the supply control unit 22 determines that the battery is the second battery 8 (step S13). The supply control unit 22 determines the type of battery based on, for example, the battery information. The battery information here is information indicating the second battery 8, and may be generated by the supply control unit 22 or the like.

The comparison unit 25 compares the mounted battery information and the battery information stored in the storage unit 24 (step S14).

In a case where the mounted battery information matches the battery information (YES in step S15), the process proceeds to step S16. In a case where the mounted battery information does not match the battery information (NO in step S15), the process proceeds to step S17.

The power supply control system 1 continues the supply of power to the reception unit 23 on the assumption that normal control is possible (step S16). Furthermore, the supply control unit 22 generates and outputs state information indicating that the communication state is abnormal due to the fact that the communication connector 4 is not connected. The supply control unit 22 may notify the user of the vehicle 2 of the state information by displaying the state information on a display or the like included in the vehicle 2.

The comparison unit 25 notifies the user of the vehicle 2 of the abnormality by displaying information indicating that the comparison result is abnormal on the display or the like included in the vehicle 2 (step S17).

As described above, in the power supply control system 1, the type of the battery mounted on the vehicle 2 is determined on the basis of the presence or absence of connection of the communication connector 4 and the status of power supply to the reception unit 23. According to such a configuration, it is possible to determine whether the battery mounted on the vehicle 2 is the first battery 3 having the battery control device 30, the second battery 8 not having the battery control device 30, or unknown, and it is possible to determine that the communication connector 4 is left unplugged when the first battery 3 is mounted. Therefore, in this power supply system, appropriate control can be executed according to the type and connection state of the battery mounted on the vehicle 2.

In the present embodiment, the power supply control system 1 further includes the storage unit 24 that stores the mounted battery information related to mounting of the battery, and the comparison unit 25 that compares the mounted battery information stored in the storage unit 24 with battery information related to identification of the battery connected to the electrical connector 5. This makes it possible to appropriately operate the battery connected to the electrical connector 5.

In the present embodiment, the comparison unit 25 is provided in the vehicle control device 20. In this case, the comparison processing between the mounted battery information and the battery information can be completed on a side of the vehicle control device 20.

In the present embodiment, the connection determination units 21 and 31 determine whether or not the communication connector 4 is connected on the basis of whether or not the CAN communication between the vehicle control device 20 and the battery control device 30 is successfully connected.

In this case, the presence or absence of connection of the communication connector 4 can be determined using the existing configuration.

In the present embodiment, the connection determination units 21 and 31 include the connection detection circuit that detects physical connection of the battery to the communication connector 4, and determine whether or not the communication connector 4 is connected on the basis of an open or closed state of the connection detection circuit. In this case, it is possible to more reliably detect whether or not the communication connector 4 is connected.

In a case of determining that the battery is the second battery 8, the supply control unit 22 generates the state information indicating that the communication state is abnormal. In this case, for example, this facilitates the operation of limiting the battery mounted on the vehicle 2 to the first battery 3.

The industrial vehicle may be mounted with the vehicle control device 20 constituting the power supply control system 1. In the industrial vehicle to which the vehicle control device 20 constituting the power supply control system 1 is applied, appropriate control can be executed according to the type and connection state of the battery mounted on the vehicle 2.

Figure 7:
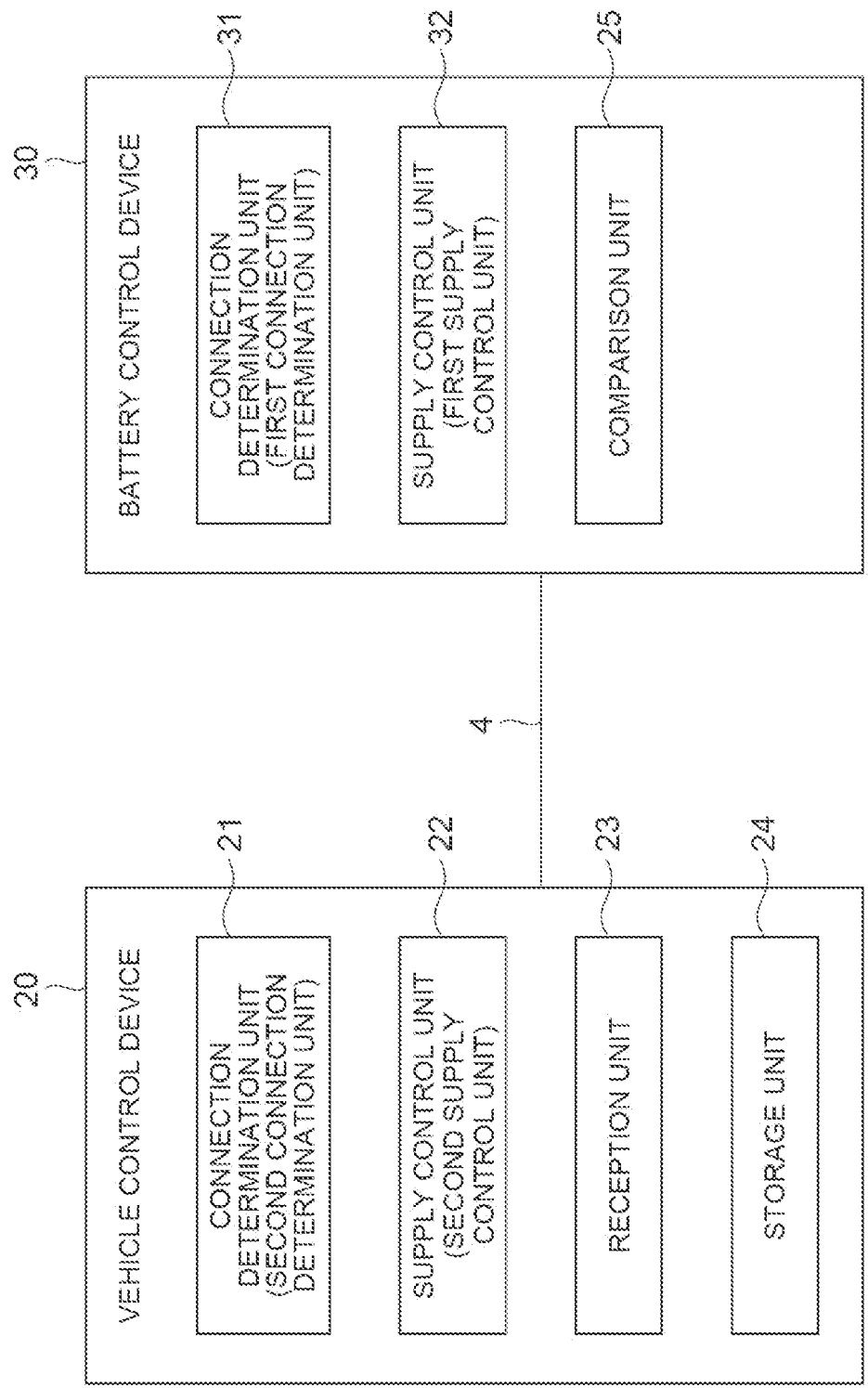
FIG. 7 is a block diagram illustrating functions according to a modification of the power supply control system.

The present disclosure is not limited to the above embodiments. For example, as illustrated in FIG. 7, the comparison unit 25 may be provided in the battery control device 30. In this case, the comparison unit 25 transmits a request for checking an activation status of the vehicle control device 20, a request for acquiring the mounted battery information, and the like to the vehicle control device 20 via the communication connector 4 at predetermined time intervals. The comparison unit 25 receives the mounted battery information stored in the storage unit 24 from the vehicle control device 20. Then, the comparison unit 25 compares the received mounted battery information with the battery information. The comparison unit 25 transmits a comparison result to the vehicle control device 20, and displays the comparison result on a display or the like included in the vehicle 2. In this case, by causing the battery control device 30 to execute the comparison processing between the mounted battery information and the battery information, it is possible to reduce the number of changes to the existing vehicle control device 20.

In addition, in the above embodiment, it has been described that the state information is generated and output by the supply control unit 22 in a case where the second battery 8 is mounted on the vehicle 2, but generation and output of the state information are not essential.

Furthermore, the connection determination units 21 and 31 may determine that the communication connector 4 is connected in a case where the CAN communication is successful or the connection detection circuit 6 is in a closed state. The connection determination units 21 and 31 may determine that the communication connector 4 is not connected in a case where the CAN communication fails and the connection detection circuit 6 is in an open state. In this case, even in a case where only the connection detection circuit 6 is disconnected (failed), the presence or absence of connection of the communication connector 4 can be determined.

REFERENCE SIGNS LIST 1 power supply control system
2 vehicle
3 first battery
4 communication connector
5 electrical connector
6 connection detection circuit
7 output cutoff relay
8 second battery
20 vehicle control device
21, 31 connection determination unit
22, 32 supply control unit
23 reception unit
24 storage unit
25 comparison unit
30 battery control device

The invention claimed is:

1. A power supply control system determining a type of a battery mounted on a vehicle and controlling power supply to the vehicle by the battery, the power supply control system comprising:
 a vehicle control device including a receptor configured to receive power from a first battery having a battery control device or a second battery not having a battery control device, an electrical connector electrically connected to the battery, and a communication connector connected to the battery control device so as to be capable of communicating information;
 a connection determination unit configured to determine whether or not the communication connector is connected in a case where the battery is connected to the electrical connector; and
 a supply controller configured to control availability of power supply from the battery to the receptor based on a determination result of the connection determination unit and a power supply status to the receptor, wherein
 the supply controller
 determines that the battery is the first battery, and permits power supply to the receptor in a case where it is determined that the communication connector is connected and there is no power supply to the receptor,
 determines that the battery is unknown and prohibits power supply to the receptor in a case where it is determined that the communication connector is not connected and there is no power supply to the receptor, and
 determines that the battery is the second battery in a case where it is determined that the communication connector is not connected and there is power supply to the receptor.

2. The power supply control system according to claim 1, further comprising:
 a storage unit configured to store mounted battery information related to mounting of the battery; and
 a comparison unit configured to compare the mounted battery information stored in the storage unit with battery information related to identification of the battery connected to the electrical connector.

3. The power supply control system according to claim 2, wherein the comparison unit is provided in the vehicle control device.

4. The power supply control system according to claim 2, wherein the comparison unit is provided in the battery control device.

5. The power supply control system according to claim 1, wherein the connection determination unit determines whether or not the communication connector is connected based on whether or not CAN communication between the vehicle control device and the battery control device is successfully connected.

6. The power supply control system according to claim 1, wherein the connection determination unit includes a connection detection circuit configured to detect physical connection of the battery to the communication connector, and determines whether or not the communication connector is connected based on an open or closed state of the connection detection circuit.

7. The power supply control system according to claim 1, wherein the supply controller generates state information indicating that a communication state is abnormal in a case of determining that the battery is the second battery.

8. An industrial vehicle mounted with the vehicle control device constituting the power supply control system according to claim 1.

* * * * *